United States Patent [19]

Uchikawa et al.

[11] 4,248,667
[45] Feb. 3, 1981

[54] METHOD OF OPERATING NUCLEAR REACTORS

[75] Inventors: Sadao Uchikawa; Masayuki Izumi; Hiromi Maruyama; Renzo Takeda, all of Hitachi, Japan

[73] Assignee: Hitachi, Ltd., Japan

[21] Appl. No.: 936,922

[22] Filed: Aug. 25, 1978

[30] Foreign Application Priority Data

Aug. 26, 1977 [JP] Japan .................................. 52-101558

[51] Int. Cl.³ .............................................. G21C 7/08
[52] U.S. Cl. ..................................... 176/24; 176/20 R
[58] Field of Search ............... 176/22, 24, 20 R, 36 R, 176/54-56

[56] References Cited

U.S. PATENT DOCUMENTS

| | | | |
|---|---|---|---|
| 3,391,058 | 7/1968 | Gilbert | 176/22 |
| 3,551,289 | 12/1970 | Eich et al. | 176/22 |
| 3,799,839 | 3/1974 | Fischer et al. | 176/20 R |
| 3,910,818 | 10/1975 | Sofer | 176/20 R |
| 4,057,463 | 11/1977 | Morita | 176/22 |

OTHER PUBLICATIONS

Nuc. Tech., vol. 29, No. 2, pp. 191-199 (5/76) Yokomizo et al., Man Machine Com. System for BWR Core Management.
Control of Nuclear Reactors, Schultz (1955), McGraw Hill Book Co., NY, pp. 245-255.
Part Length Control Rod Design for PWR's (11/75), Humphries pp. 1-6.

*Primary Examiner*—S. A. Cangialosi
*Attorney, Agent, or Firm*—Craig & Antonelli

[57] ABSTRACT

A method of operating a nuclear reactor wherein the reactor is operated for more than 50% of its operating period with the control rod patterns in which, in the central region of the reactor core accounting for at least 50% thereof, the control rods inserted from the bottom of the reactor core are at the depths of between 16/24 and 21/24 of the height of the reactor core with eight control rods surrounding each of said inserted control rods being fully withdrawn.

4 Claims, 22 Drawing Figures

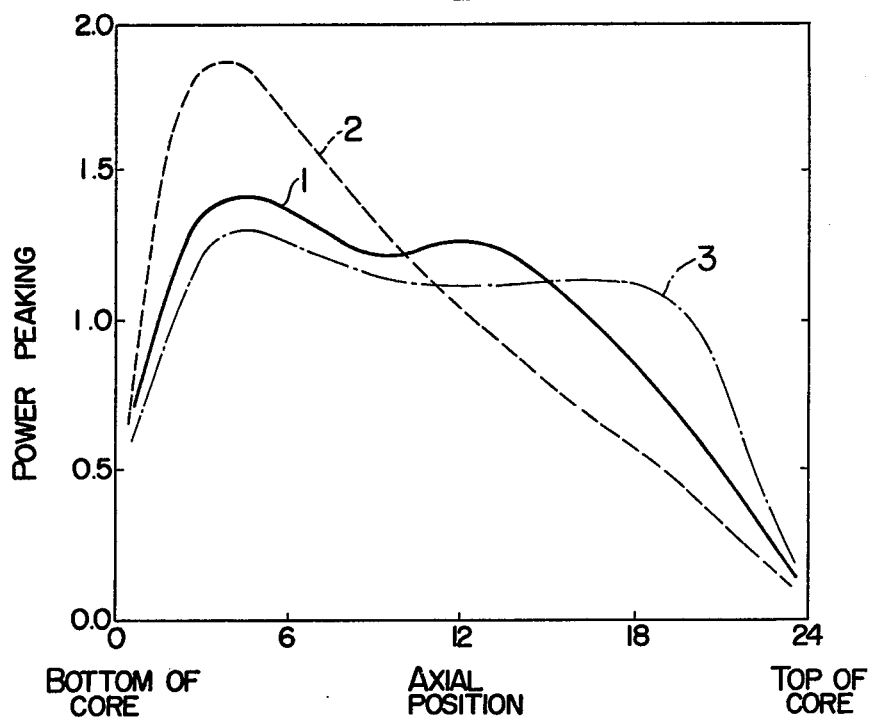
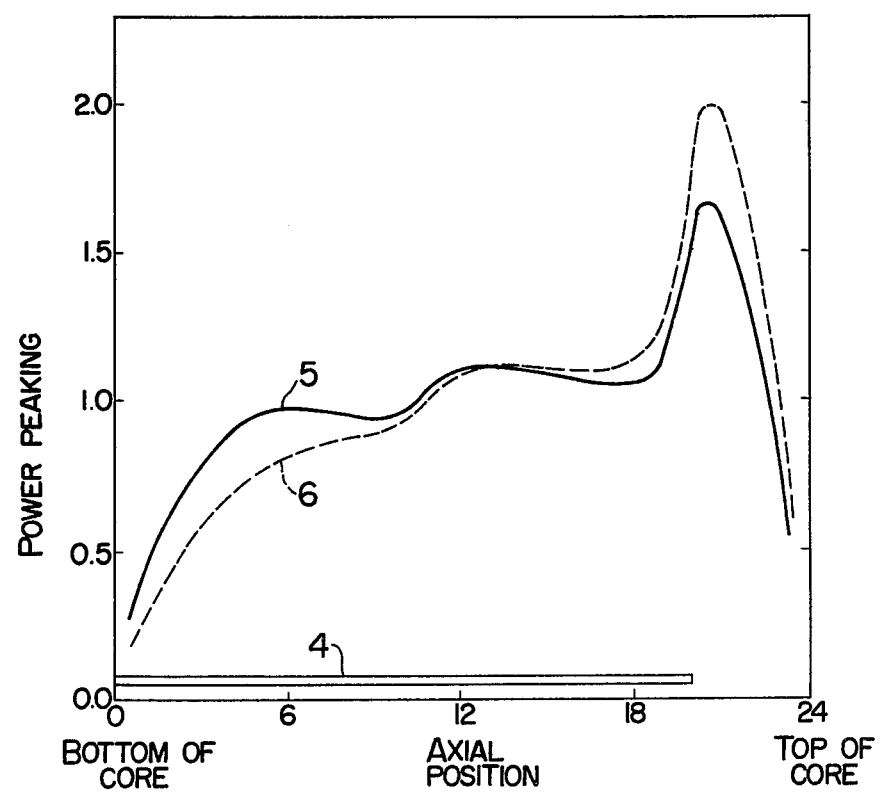

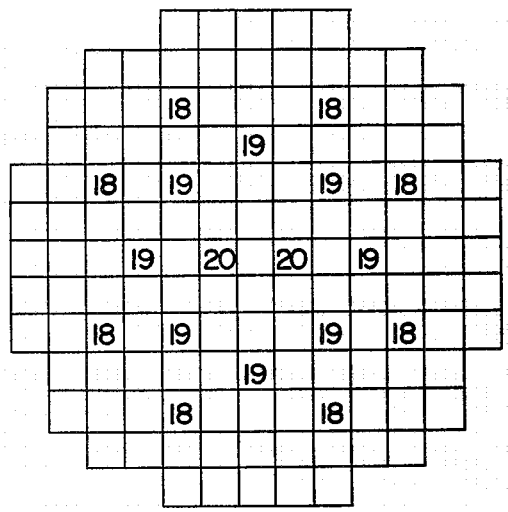
FIG. 9
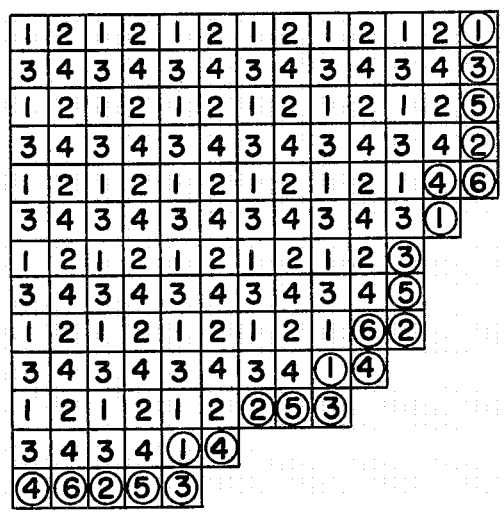
FIG. 11
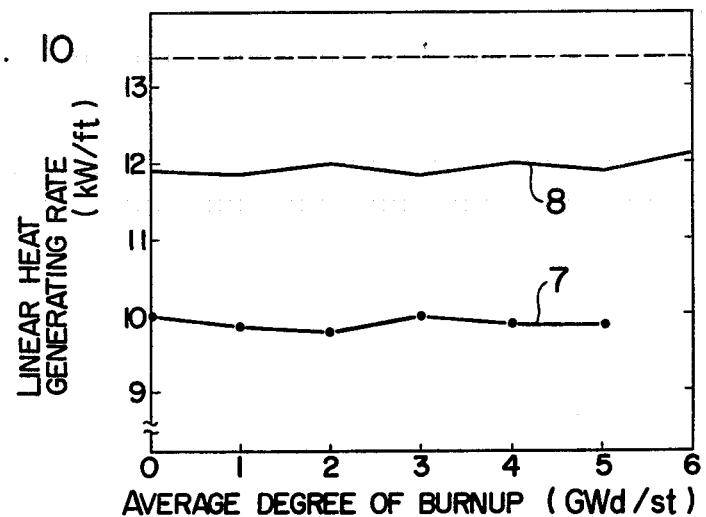
FIG. 10
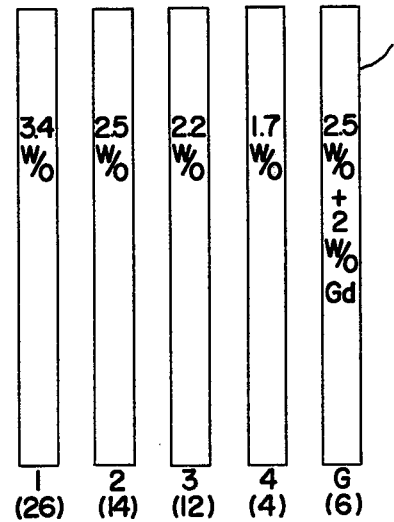
FIG. 12a
FIG. 12b

METHOD OF OPERATING NUCLEAR REACTORS

BACKGROUND OF THE INVENTION

The present invention relates to a method of operating nuclear reactors, in particular, to a method of operating a boiling-water reactor.

The boiling-water reactors have an axial void distribution so that the power distribution is skewed toward the bottom of the reactor core and the power peaking is relatively high. In order to suppress the power peaking, the control rods are inserted shallow from the bottom of the reactor core.

FIG. 1 shows in horizontal section an example of the conventional control rod pattern. Each square includes one control rod surrounded by four fuel assemblies. The numerals in squares indicate the control rod insertion ratio. That is, the axial height of the reactor core is divided into 24 unit lengths, and the numeral in a square shows that the control rod is inserted from the bottom of the reactor core to the depth indicated by that unit lengths. Therefore, the higher the numeral, the deeper the control rod is inserted. The blank square with no numeral indicates that the control rod is completely or fully withdrawn. It can be seen that the control rod pattern is very complicated. Many calculations are required for determining the control rod pattern. Furthermore there arises the problem that the power changes abruptly in the vicinity of the tip end of the control rod which is being inserted shallow.

In order to overcome the above problems, Japanese Patent Application Nos. 51-116268 and 51-115269 disclose the reactor in which the reactor core is divided into two regions at the axial midpoint between the top and bottom thereof so that the infinite multiplication factor may be higher in the upper region than the lower region and consequently the axial power distribution may be flattened. FIG. 2 shows, by curve 1, the average axial power distribution in such a core when the control rods are fully withdrawn. It can be seen that, as compared with the distribution curve 2 of the conventional reactor core, the power distribution is remarkably flattened. According to the above inventions, it is only required to flatten the power distribution in the core in the radial direction thereof with the control rods. That is, the power distribution is only dependent upon the pattern of control rods which are inserted deep. However, even if the above reactor is operated with the control rod pattern constituted merely by withdrawing shallow control rods from the conventional control rod pattern shown in FIG. 1, the satisfactory flattening of the output distribution cannot be attained because the conventional control rod pattern is intended to flatten the power distribution with the combination of the control rods which are inserted deep and shallow. As a result, the advantages of the above reactor core cannot be fully substantiated.

SUMMARY OF THE INVENTION

Accordingly, the object of the present invention is to provide a method of operating a nuclear reactor of the type in which the radial power distribution and reactivity may be required to be controlled mainly with control rods, such as the nuclear reactor described in the above Japanese Applications.

BRIEF DESCRIPTION OF THE DRAWINGS

FIGS. 2 and 3 shows the axial power distributions;

FIGS. 4 to 9 show the control rod patterns used in the first embodiment according to the present invention;

FIG. 10 shows the variation in linear heat generating rate of fuel rods when the reactor is operated by the first embodiment;

FIG. 11 shows a quadrant horizontal section of the reactor core associated with the second embodiment of the present invention, illustrating the equilibrium cycle refueling;

FIGS. 12a and 12b schematically show the construction of a fuel assembly charged into the reactor core associated with the second embodiment according to the present invention;

DESCRIPTION OF THE PREFERRED EMBODIMENTS

Figure 1:
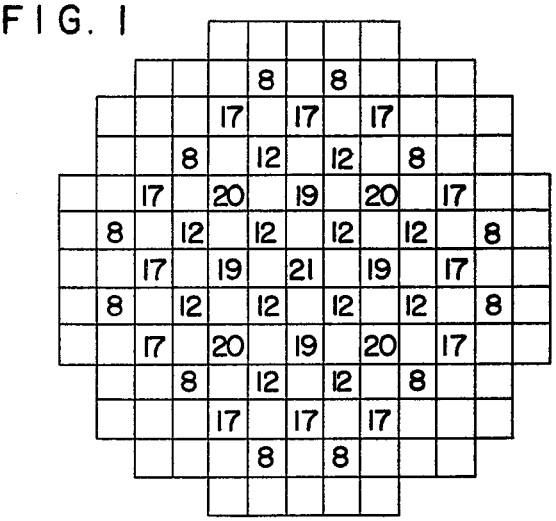
FIG. 1 shows a control rod pattern for the core of a conventional boiling water reactor.
Figure 4:
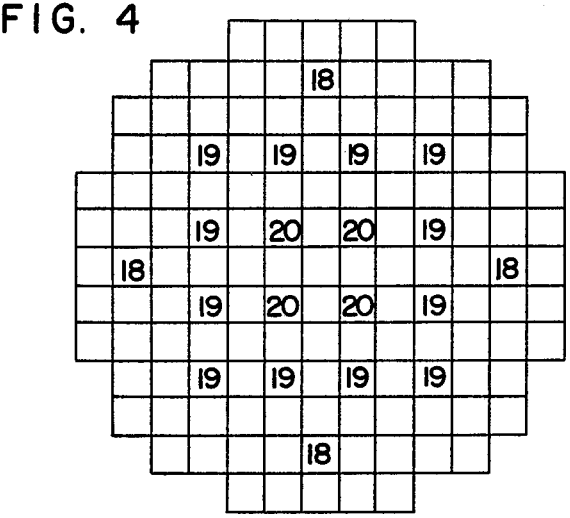
Figure 5:
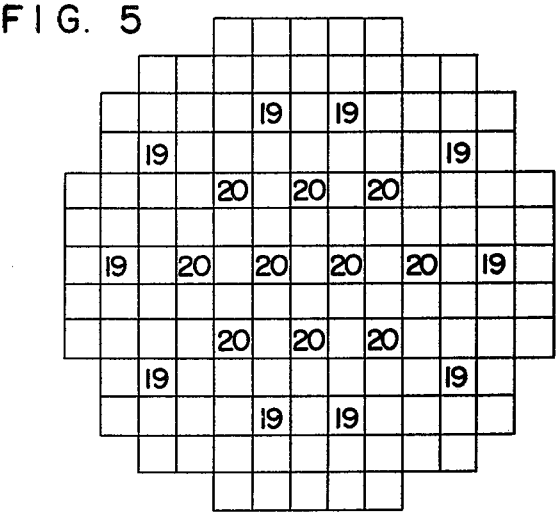
Figure 6:
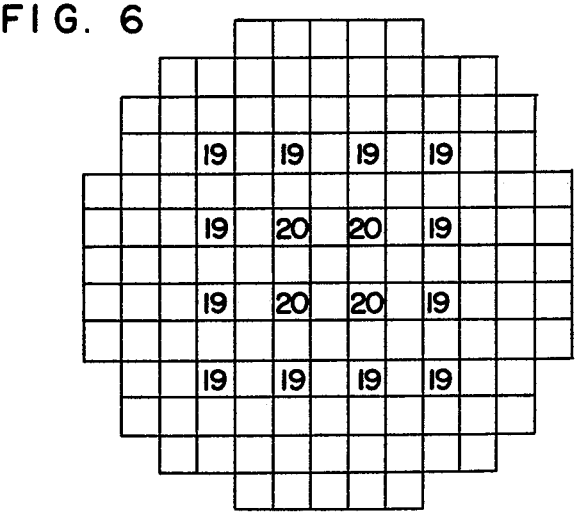
Figure 7:
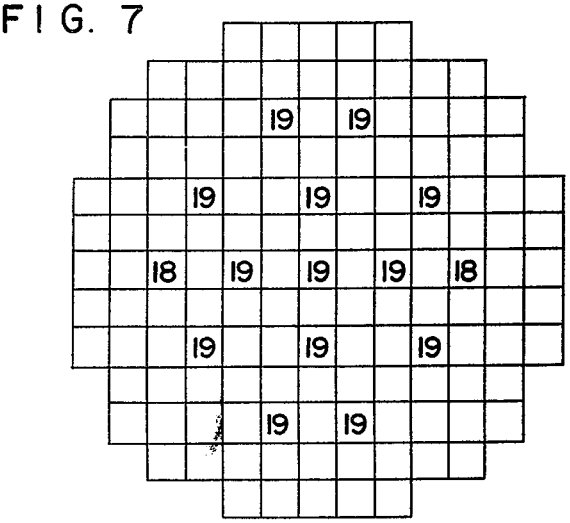
Figure 8:
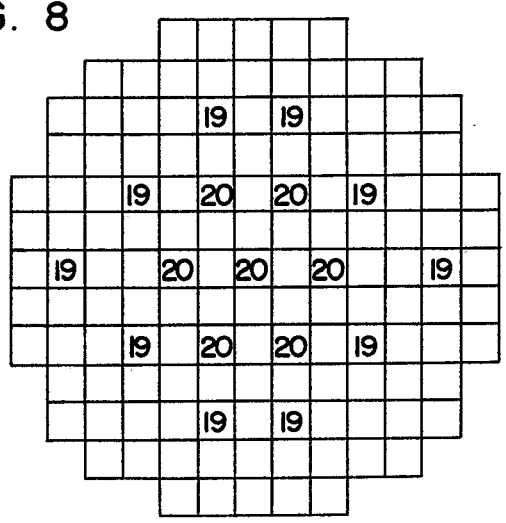

In general, the control rods for flattening the radial power distribution in a nuclear reactor are inserted deep in order to avoid a wide distortion of the axial power distribution upon insertion thereof. According to the present invention, the depths of the control rods which are inserted in the central region corresponding to 50% of the reactor core is limited to 16/24 to 21/24 of the height of the reactor core with 8 control rods surrounding the inserted control rod fully withdrawn to constitute control rod patterns.

In case of a reactor of the type in which the positive control of the axial power distribution with control rods is not effected, the axial power peaking varies with burnup. In case of the equilibrium cycle core of 300 MWe which is later described in connection with the second embodiment, the axial power peaking is not uniform in the radial direction, and is in general higher in the peripheral region than in the central region. As a result, even if the control rods are inserted less than 16/24 of the height of the reactor core in the peripheral region thereof, the excessive distortion of the axial power distribution may not occur. Thus, the region in which the control rod insertion depth is limited is determined as the central region corresponding to 50% of the reactor core.

The reason why the control rods are not required to be inserted shallow in the central region of the reactor core is that the axial power peaking in the lower region of the reactor core when the control rods are fully withdrawn is less than 1.4. This axial power peaking value is derived on the assumption that, in the conventional reactor, the maximum gross peaking factor be 2.0 and the radial power peaking factor be 1.4. If the axial power peaking is 1.4 when the control rods are fully withdrawn, higher power increase is caused at the upper ends of the control rods which are inserted less than 16/24 in order to control the radial power distribution. As a result, the satisfactory reduction in gross power peaking cannot be attained. This is the reason why the lower limit of the control rod insertion depth is determined as 16/24. The upper limit of the control rod insertion depth is 21/24. The reason is that the power in the upper region of the reactor core is increased due to the power increase effect at the upper ends of the control rods as compared with the curve 1 in FIG. 2 in which control rods are fully withdrawn, whereby the average axial power distribution may be flattened as indicated by the curve 3.

Furthermore, according to the present invention, eight control rods which surround the inserted control rod are not inserted, that is fully withdrawn, because if the adjacent control rods are inserted, the power peaking at the upper ends of the control rods is amplified due to the rod shadowing effect between them.

In FIG. 3, the curve 5 shows the axial power distribution of a fuel assembly when the control rod 4 is inserted to 20/24 of the height of the reactor core and the eight control rods surrounding this control rod 4 are fully withdrawn. The curve 6 shows the axial power distribution when one of the eight surrounding control rods is inserted additionally. It can be seen that when the adjacent control rod is inserted, the power peaking at the upper ends of the control rods is amplified.

Furthermore, according to the present invention, the operating period applied with the above insertion of control rods is for at least 50% of the entire operating period of the nuclear reactor. This is because the operating period of the nuclear reactor includes a burnup period in which the power distribution is flattened without application of the particular insertion of control rods. For instance, toward the end of the operating period, the fuel elements are burned up so that the effect of self-flattening of the power distribution may be expected without inserting the control rods. Thus, the above control rod insertion is not necessarily required over the entire period of the operation of the nuclear reactor.

So far the freedom of the positions of the control rods which are inserted deep has been limited by use of the control rods which are inserted shallow, but, according to the present invention, the positions of the control rods which are inserted deep may be freely selected to form a desired pattern to flatten the radial power distribution. In addition, the fact that the insertion depths of the control rods are adjustable within the above described range depending upon the variation in axial power peaking due to burnup at the lower region of the reactor core allows the axial power distribution to be also flattened. Thus, the fuel elements may be subjected to lesser thermal loads.

First Embodiment, FIGS. 4 to 10

The first embodiment of the present invention will be described in conjunction with a boiling water reactor with the capacity of 800 MWe. The reactor core comprises 560 fuel assemblies. The thermal power is 2400 MW. The reactor is operated under the condition that the linear heat generating rate of fuel rods must be less than 13.4 kW/ft.

According to the invention disclosed in Japanese Patent Application No. 51-115268, the enrichment factors in the portions of the fuel assembly above and below 11/24 of the total length thereof are different so as to attain the infinite multiplication factor distribution which cancels out the skewing of the power distribution due to the void distribution. The axial power distribution (the curve 2 in FIG. 2) is flattened when the control rods are fully withdrawn so that the shallow insertion of the control rods is not required.

FIGS. 4 to 9 show the control rod patterns when the average degree of burnup is 0 GWd/st, 1 GWd/st, 2 GWd/st, 4 GWd/st and 5 GWd/st, respectively. It can be seen that the insertion depths are between 18/24 and 20/24 from the bottom of the reactor core and will not change over a wide range due to burnup. The control rod pattern is changed every 1 GWd/st so that the radial distribution of degree of burnup may be flattened.

The curve 7 in FIG. 10 shows the variation in the linear heat generating rate when the reactor is operated with the control rod patterns shown in FIGS. 4 to 9. The curve 8 shows the variation in linear heat generating rate in the same reactor with the control rod pattern shown in FIG. 1. It can be seen that, according to the present invention, the linear heat generating rate has a margin of 25% relative to the upper limit 13.4 kW/ft and is 15% lower as compared with the conventional operation method. Thus, the fuel elements may be subjected to less thermal loads during operation.

Second Embodiment, FIGS. 11 to 21

In the second embodiment, the present invention is applied to the equilibrium cycle core of the 800 MWe boiling water reactor in which refueling takes place based upon a predetermined system every year.

Referring to FIG. 11 which shows a quadrant horizontal section of the reactor core, one square represents one fuel assembly, and the numerals in the squares represent the sequence of refueling. That is, four fuel assemblies in the central region which are grouped as one refueling unit are replaced with fresh ones in the order of 1, 2, 3 and 4 one by one every year. The fuel assemblies ①-⑥ adjacent to the core walls are refueled after they stay for six years in the reactor.

FIGS. 12a and 12b schematically show the construction of the fuel assembly charged in the central region. The numerals in the fuel rods 9 indicate the enrichment of uranium 235 and the concentration of burnable poison or gadolinea. The numerals below the fuel rods 9 indicate the types of the fuel rods and the numerals in the parentheses represent the numbers of fuel rods included in each fuel assembly 10. The fuel rod containing gadolinea is indicated by G. The numerals in the fuel assembly 10 indicate the types of the fuel rods. Water rods are indicated by W. The fuel assembly 10 includes 6 fuel rods containing 2 w/O gadolinea.

Figure 13:
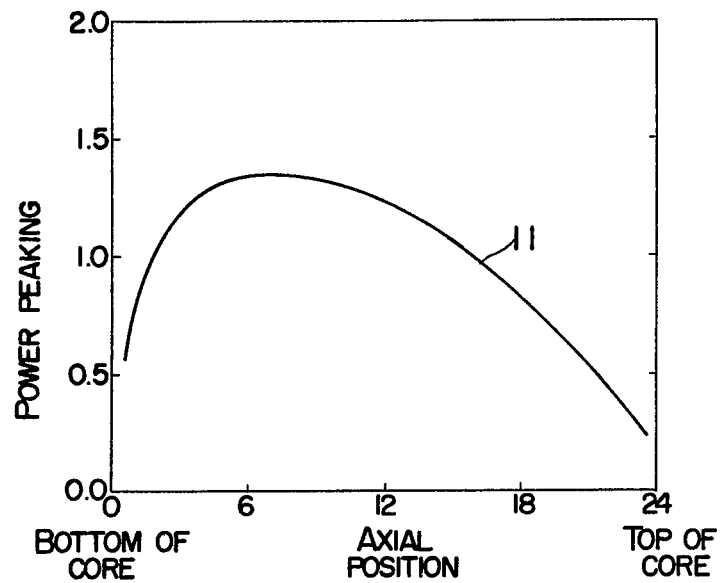
FIG. 13 shows the characteristics of the power distribution in the axial direction of the reactor core.
Figure 14:
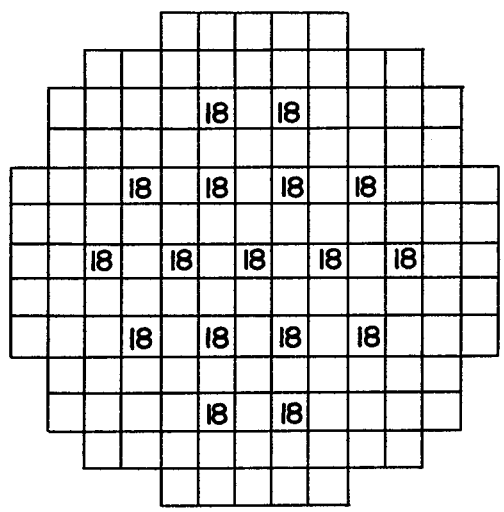
FIGS. 14 to 20 show the control rod patterns used in the second embodiment.
Figure 15:
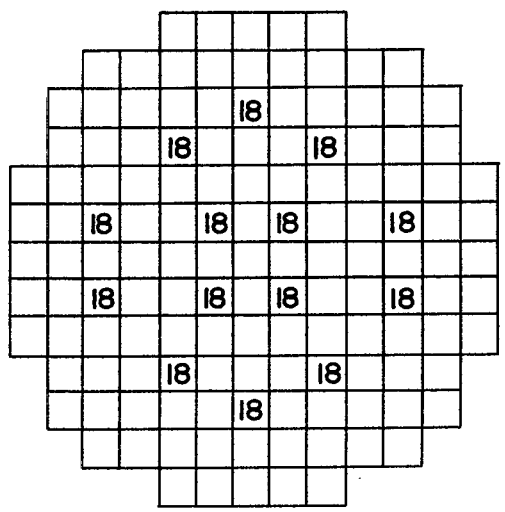
Figure 16:
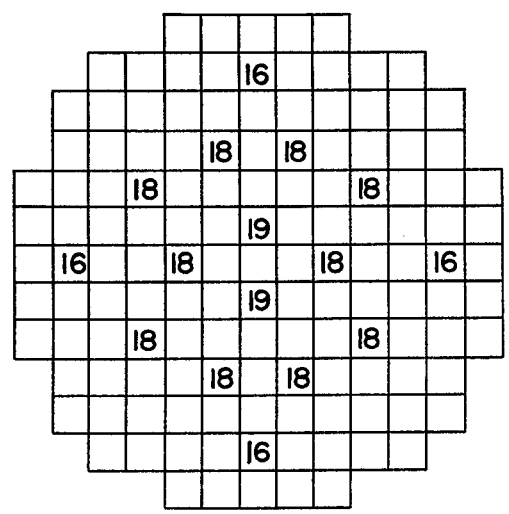
Figure 17:
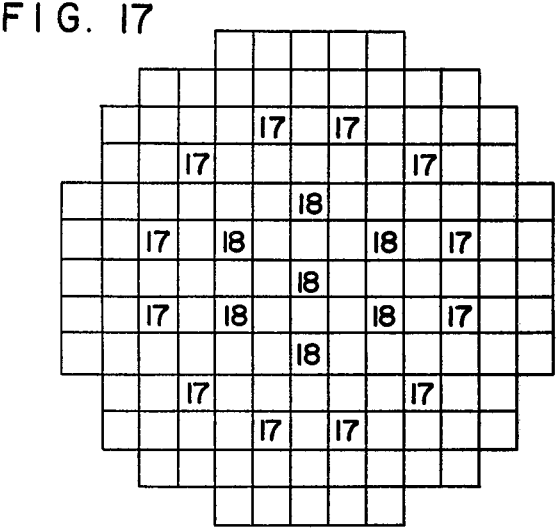
Figure 18:
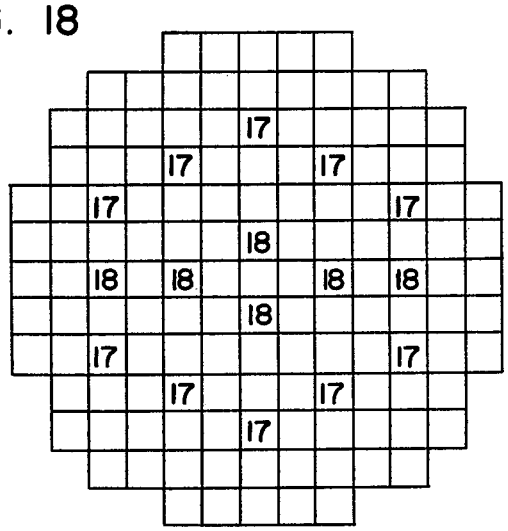
Figure 19:
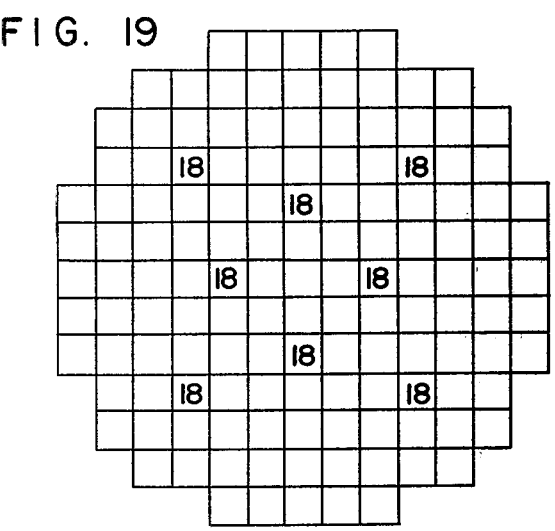
Figure 20:
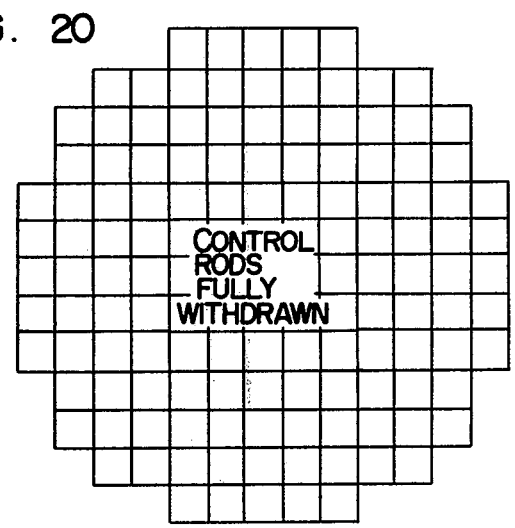

In FIG. 13 the curve 11 shows the average axial power distribution of the equilibrium cycle core when the control rods are fully withdrawn in the initial stage of the cycle. The axial peaking factor is 1.35 at the region close to the bottom of the reactor core so that the shallow insertion of the control rods is not required.

FIGS. 14 to 20 show the control rod patterns at the cycle degree of burnup of 0 GWd/t, 1 GWd/t, 2 GWd/t, 3 GWd/t, 4 GWd/t , 5 GWd/t and 6 GWd/t, respectively. During the intermediate stage of from 2 GWd/st to 4 GWd/st, the axial power peaking tends to become higher at the circumferential or perpheral region of the core. Therefore, the control rods adjacent to the circumferential region of the core are inserted shallower than those in the central region so that the power peaking may be reduced. In the above control rod patterns, the number of the inserted control rods is dependent upon the excess reactivity of the reactor. At 6 GWd/st in the end of the cycle, there is no excess reactivity so that the control rods are fully withdrawn.

Figure 21:
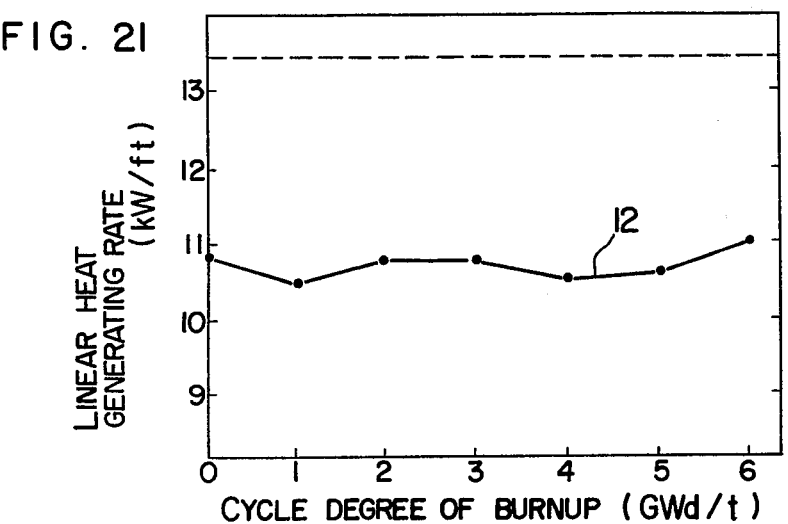
FIG. 21 shows the variation in linear heat generating rate of fuel rods when the reactor is operated by the second embodiment.

The curve 12 in FIG. 21 shows the variation in linear heat generating rate in case of the operation with the above described control rod patterns. According to the second embodiment, the linear heat generating rate has a margin of 18% with respect to the limit value of 13.4 kW/ft so that the fuel elements may be subjected to less thermal loads. According to the conventional operating methods, the control rods are inserted shallow so as to control burnup in the lower region of the reactor core. As a consequence, toward the end of the cycle, a high power peaking appears when the control rods are fully withdrawn. However, according to the operating method of the present invention, no shallow control rod is inserted so that there is a distinct advantage in that even if the control rods are fully withdrawn toward the end of the cycle, no high power peaking occurs.

What is claimed is:

1. A method of operating a boiling-water reactor having a core in which fuel assemblies each having an axially substantially flattened power distribution are disposed, comprising the steps of:
   (a) inserting predetermined control rods to a depth of 16/24 to 21/24 of the height of the core in the central region of the core accounting for at least 50% of the entire region of the core;
   (b) fully withdrawing all the control rods surrounding said predetermined control rods; and
   (c) operating the reactor for over 50% of the operating period thereof in such a manner that said steps (a) and (b) are practiced during such a period.

2. A method as claimed in claim 1, wherein said steps (a) and (b) are practiced in the entire region of the core.

3. A method as claimed in claim 1 or 2, wherein eight control rods surround each predetermined control rod.

4. A method as claimed in claim 1, wherein only control rods inserted to a depth of 16/24 to 21/24 of the height of the core in the central region of the core accounting for at least 50% of the entire region of the core are utilized for controlling operation of the reactor for over 50% of the operating period thereof so as to effect only a deep control rod pattern.

* * * * *